United States Patent [19]
Colburn, Jr.

[11] Patent Number: 4,685,421
[45] Date of Patent: Aug. 11, 1987

[54] CATTLE/EWE ESTRUS DETECTOR DEVICE

[76] Inventor: Everett L. Colburn, Jr., 1340 Sycamore St., Gridley, Calif. 95948

[21] Appl. No.: 843,289

[22] Filed: Mar. 24, 1986

[51] Int. Cl.⁴ .............................................. A01K 29/00
[52] U.S. Cl. ....................................................... 119/1
[58] Field of Search ............................................ 119/1

[56] References Cited
U.S. PATENT DOCUMENTS 3,158,134  11/1964  Larson ..................................... 119/1
3,942,475  3/1976  Wassilieff et al. ....................... 119/1

Primary Examiner—Robert Peshock
Attorney, Agent, or Firm—Mark C. Jacobs

[57] ABSTRACT

A device for determining cattle estrus, to be secured to the rump of a cow comprising a releasably secured semaphore capable of movement to a generally vertical second position upon release from a first position said semaphore being released by the application of body weight of a second cow upon the rump of the wearer. This device will also enable the determination of when female sheep female (ewes) have been bred. By attaching the device to the rump of a ewe, the semaphore will be released by the application of body weight of the ram during coitus.

10 Claims, 8 Drawing Figures

CATTLE/EWE ESTRUS DETECTOR DEVICE

BACKGROUND OF THE INVENTION

In order to be able to carry on artificial insemination of cattle for the breeding thereof, it is necessary to determine when the cows are in heat. Since these animals are in heat for a relatively short period of time, usually about 6 to 8 hours and more frequently during the night time hours, the ability to determine this time period is of utmost importance. While dairy cattle roam over a generally small area, beef cattle on the range are most difficult to follow to determine their periods of heat.

Various methods and devices have been proposed to solve the problem, none of which have proven successful in the marketplace, especially since cows tend to go into heat about 70% of the time at night.

One of the most recent ones, and the only one knownto applicant to be covered by a U.S. patent is the device of Rule et al as disclosed and claimed in U.S. Pat. No. 3,076,431.

It has been recited in the literature that when cows are not in heat, they will not allow other animals to mount them for more than a moment or two. But when the cow is in heat, mounting can take place for a significant period of time. By observation it has been determined that any cow that permits itself to be mounted for a period of over three seconds is in fact in heat, absent any physical abnormality.

It is an object therefore of this invention to provide a new device to be attached to the rump of a cow which is capable of giving a clear signal as to when a cow is in heat whether she will stand for three seconds or will allow only an instant mount.

Another object is to provide a non-chemical indicator that advises the viewer when a cow is in estrus and is visible at a relatively great distance laterally.

Another object is to provide a device that will allow one to determine at a distance if a cow or ewe has been mounted.

Yet another object is to provide a low cost of manufacture and an easy to use device to determine cow estrus.

Still another object is to provide a device that indicates when a cow is in heat and minimizes the number of false positive readings.

Other objects of the invention will in part be obvious and will in part appear hereinafter.

The invention accordingly comprises the apparatus possessing the construction, combination of elements and the arrangement of parts which are exemplifed in the following detailed disclosure, and the scope of which will be indicated in the claims.

For a fuller understanding of the nature and objects of the invention, reference should be had to the following detailed description taken in conjunction with the accompanying drawings.

SUMMARY OF THE INVENTION

A semaphore signal secureable to the rump of a cow or ewe, the flag arm of which will be released from a flag holder under pressure applied to said flag holder whereby a segment of said flag holder which is secured to both said flag arm and the balance of the holder, separates from the balance of the holder freeing said arm from said holder such that said arm and said segment will then rise from a first position to a second position.

DESCRIPTION OF THE PREFERRED EMBODIMENT

Figure 1:
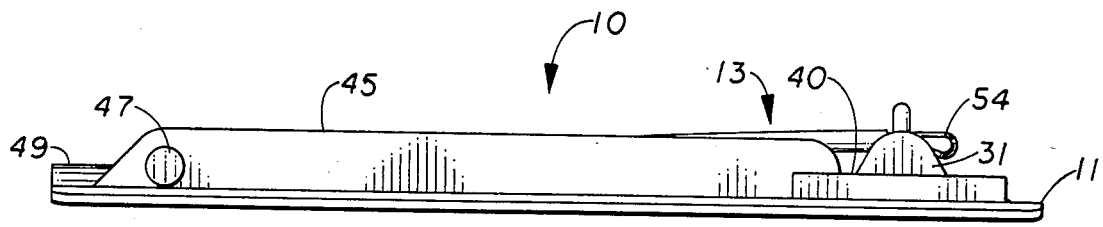
FIG. 1 is a side elevational view of the device of this invention, in its pre-operational position.
Figure 2:
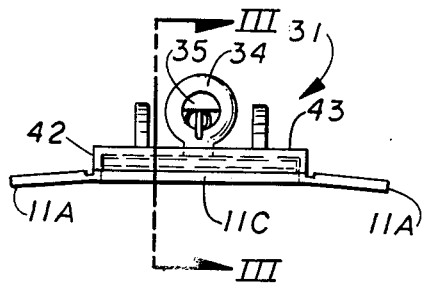
FIG. 2 is a front elevational view thereof.
Figure 3:
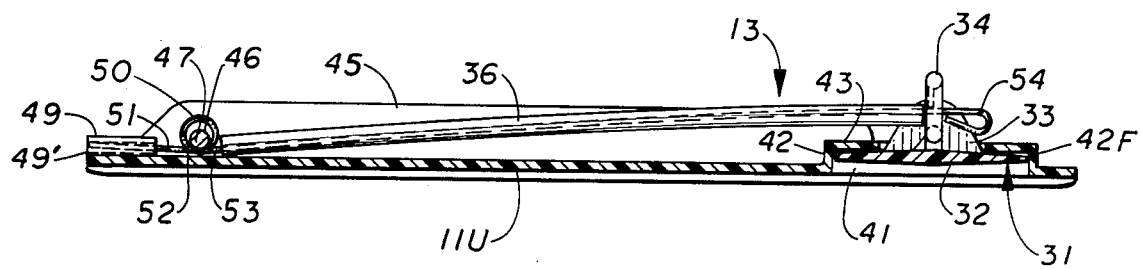
FIG. 3 is a sectional view taken along line III—III of FIG. 2.

Turning to FIG. 1 there is shown an elevational view of the instant cow estrus determination device as seen from one side. The opposite side of the device is a mirror image.

Device 10 includes a base 11 having an arm holder 31 mounted abuttingly thereto spaced slightly inward from one end thereof, and a flag arm 13 mounted at the opposite end thereof. Base 11 is a generally rectangular planar member best visible in FIG. 4, having a front edge, and a rear edge, and two side edges. Base 11 may be flat, or preferably be constructed as shown here with a central section 11C, a two slightly downward depending side sections 11A. The slight downward tilt is due to the presence of an elongated score line 12 that separates each of the side sections 11A from the central section 11C.

Figure 4:
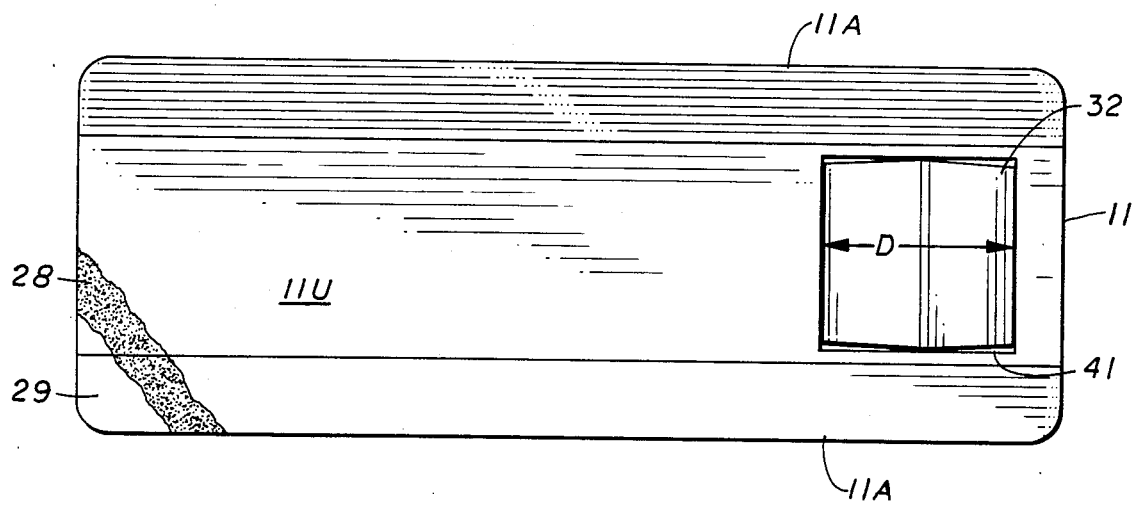
FIG. 4 is a bottom plan view.

At the forward end of base 11 there is found an upwardly raised or indented section 40 that is hollow on the underside thereof thus forming a recess adapted to receive a flag holder to be described below. This raised section may be of any configuration though square as employed here, is convenient. The recess on the underside 41, best seen in FIG. 4 is configured to correspond to the base 32 of the arm holder, which is also seen in FIG. 4.

Raised section 40, which is spaced rearwardly from the front edge of base 11, includes an upstanding side wall 42, and a top wall 43 with a central cut out, having a width and length E, and which cut out is designated 24. An optional slot 25, may extend forwardly from central cut out 24 within the front part of the top wall 42F, almost to the front part of the upstanding sidewall 42F. This slot is to accommodate any excess of the spring that may protrude forwardly, as will be described below.

A pair of spaced elongated parallel similar sized bracing members 45 may extend from either the cut out 24 rearwardly, as shown here, in FIG. 1 (or from the back part of the upstanding sidewall) to a point spaced from the rear edge of base 11. Near the rear thereof in each bracing member is a single bore 46. The two bores, taken together are axially aligned normal to said bracing members. A pivot pin 47 is secured within said pair of aligned bores. The pin can be either threaded on one end to receive a retaining nut, or it can be made of a heat deformable plastic such that one or both ends can be flattened to secure the pin within the bores 46. The processing of a plastic rod to accomplish this end is deemed conventional.

Disposed inwardly from the midpoint of the rear edge of base 11 and extending forwardly slightly beyond the terminus of each bracing member is a tubular spring retainer, 49. The bore therein 49' is directed from front to back relative to the device 10.

Secured to the underside surface 11U of base 11 may be an adhesive layer 28 with a cover sheet 29 removably disposed thereon. This cover sheet 29 is discarded at the time of application of the adhesive to a cow in heat as will be explained in futuro. The adhesive may be attached as a direct layer 28, or on a cloth sheet which itself is adhesively attached to the underside 11U. This is not shown since it, like the direct applicaion of adhesive, is well known in plastics technology.

Adhesive layer 28 may follow the contour of 11U and thus be applied to the entire underside 11U of base 11, which is preferable; or it can be applied only to that part of the underside that lies between the two score lines 12. See FIG. 4.

A typical adhesive that may be employed for the purpose herein is Livestock Identification Tag Cement made by W. J. Ruscoe of Akron, Ohio. Others are also available in the marketplace.

An arm holder 31 comprising a flat plate 32, having a width and length D, is sized slightly smaller than the width and length of the recess 41 such that plate 32 can fit within the confines of the recess. Thus dimensions "D" are less than "E". The elevation of the plate 32 is less than the elevation of the sidewall 42 such that when disposed within the recess, the flat plate 32 is disposed entirely therein. Equally spaced in from each side edge of the plate 32 is an upstanding spacer member 33. Each spacer member 33 is disposed on said plate 32 so as to be adjacent to one of the side edges of the cut out 24. But a more important purpose is to protect the frangible part 34 from the animals tail and chinning of the animals. As shown spacer members 33 are hemispherical though any shape can be employed.

Mounted frangibly at the midpoint of said plate is an upstanding detent 34, having a central throughbore 35 therein. This detent is adapted to break off from said plate as will be discussed below with respect to the operation of the device.

The last two elements of the device 10 form the flag arm 13. They are a rigid tubular member 36, in the nature of a plastic drinking straw and a wire spring 50. The tubular member 36, is sized in length to be slightly shorter than the distance between the upstanding detent 34, and the pivot pin 47. It is sized in diameter to be smaller than the space 44 between the bracing members 45.

Spring 50 has its first end 51 disposed within bore 49' of tubular retainer 49, with the balance extending forwardly therefrom. A wound portion 52 is disposed around the pivot pin 47, while a straight portion 53 is disposed within the tubular member 36, and extends forwardly therethrough and then through the detent and formed into a horseshoe second end 54 or some other configuration suitable to thereby secure the tubular member 36 indirectly to the detent and to movably secure the arm holder 31 within the recess. This is designated the pre-operational or first position. Reference is made to FIG. 1.

Figure 6:
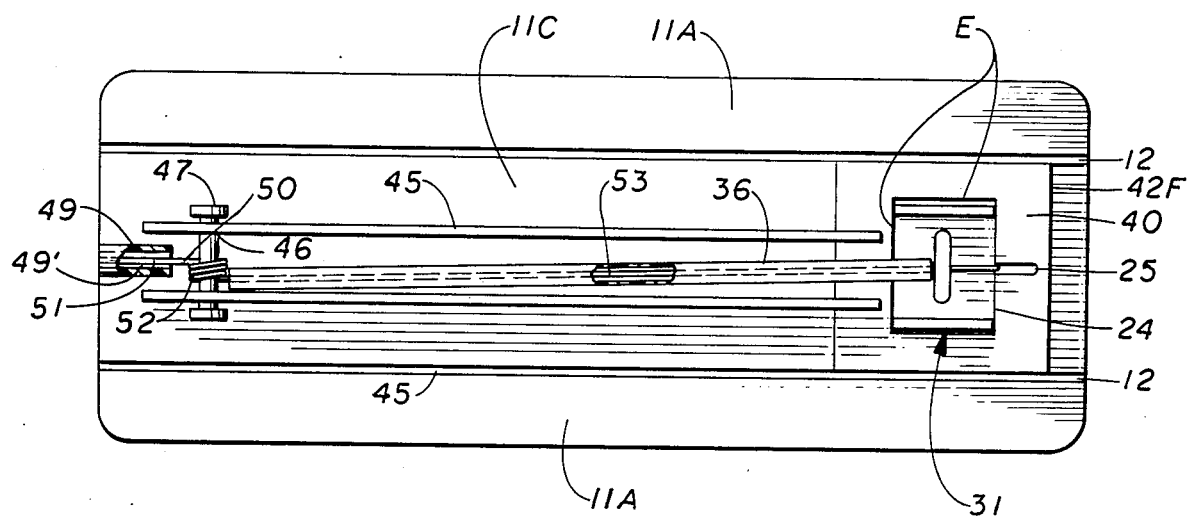
FIG. 6 is a top plan view of this invention.

The top plan view, FIG. 6 shows the benefit of having the optional slot 25 to prevent any impingement or hang up of the second end 54 of the spring 50 at the front edge of the cut out 24.

OPERATION OF THE DEVICE

Figure 8:
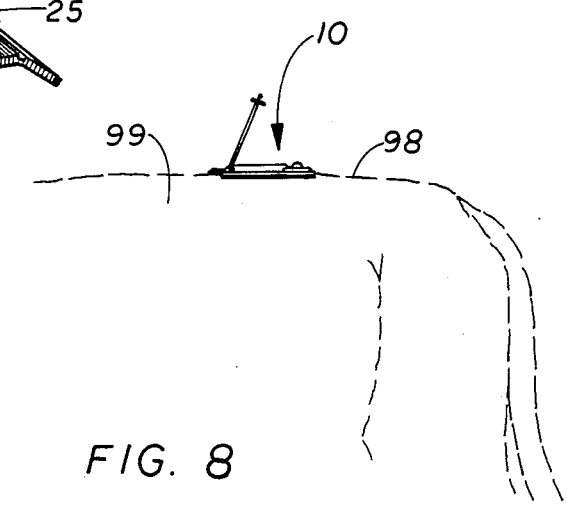
FIG. 8 shows the application of the instant device at the situs of intended use.

The device of this invention is shown in FIG. 1 in its preoperational position. That is, the configuration at the time of purchase and application to the rump of the animal. The disposition of the device after application is depicted in FIG. 8. where device 10 is seen on the rump 98 of the cow 99.

Figure 5:
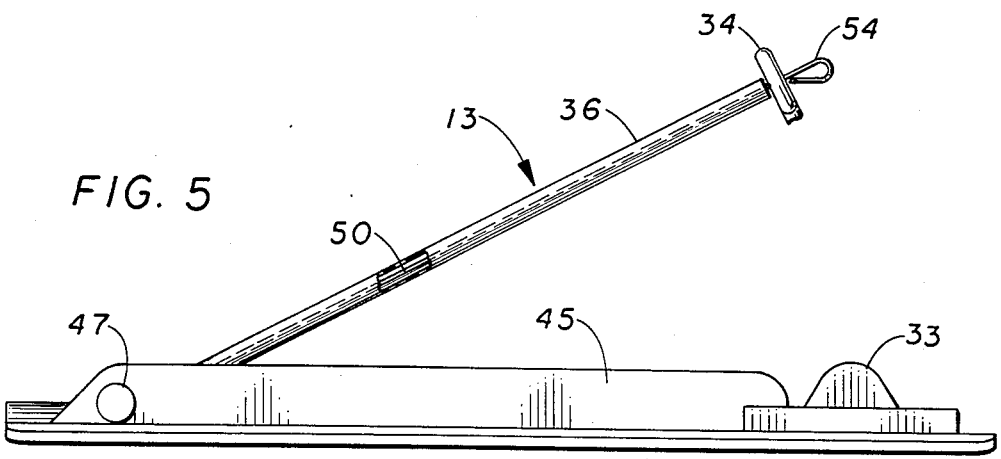
FIG. 5 is a side elevational view in its post operational position.
Figure 7:
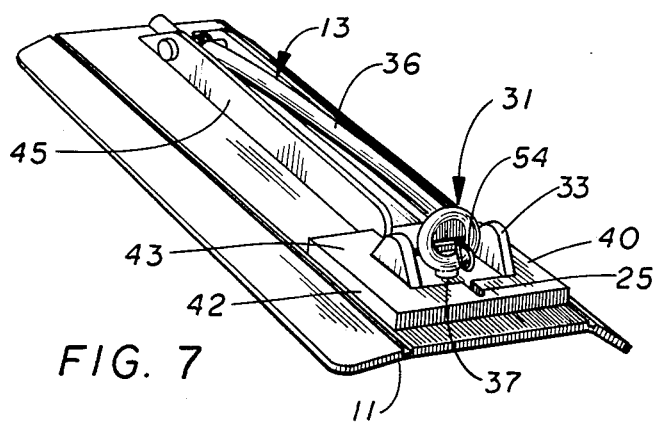
FIG. 7 is a perspective view of the instant device.

The reader's attention is called to fracture point 37 on detent 34 in FIG. 7. This is the point of attachment of the detent to the plate 32. When pressure is applied to the forward end of arm 13 which is engaged to the bore 35 within the detent 34 by the spring's second end as described above, or pressure is applied directly to the detent, 34, the detent 34 will break off or separate from the base plate 32, but may or may not remain secured to the spring 50 by the second end 54. This fracture takes place at fracture point 37 due to the movement of the mounting beast either downward onto the detent on mounting; or movement rearwardly upon sliding off of the mounted cow. When the mounting beast has removed its weight from the device, after the fracture, the flag arm will due to the springiness of spring 50 move from its generally horizontal first or retained position to a second position angularly upward toward the vertical as shown in FIG. 5.

The device is disposed far enough anteriorly on the rump such than an animal upon attempting to mount the wearer cow when that cow is not in heat will be unlikely to incidentally fracture the detent 34. This will serve to decrease false positives, since only an animal in heat will normally allow a complete mount.

Thus placement on the cow is important in this respect, needing to be as far forward as possible while still being able to be tripped when another animal is able to make a complete mount.

The entire device of this invention may be made of low cost plastic. Thus the base 11 may be molded from low density polyethylene, while the plate, spacer members and detent, can be molded as a single unit of high impact styrene. The pin upon which a portion of the spring is wound may also be made of high impact sytrene. The tubular portion of the flag arm may be made of nylon or polyethylene or other suitable material.

A typical unit according to this invention would be about 6.5 inches from the front edge to the rear edge of the base, with the width thereof being about 2.625 inches. This unit would utilize a 4.5 inch tubular member component of the flag arm.

When applied on the animal, be it ewe or cow the pivot pin faces toward the head and the detent faces the tail.

It is important to understand that cows at time of estrus are homosexual and sheep are not. It is also important to understand that cattle are bred by artificial insemination,—thus this device is used to indicate breeding time; whereas sheep are bred by using a ram to inseminate the ewe,—thus the device is used to determine the date of probable insemination.

It is believed that the device could be employed with other animals as well. To do so would be within the skill of the art.

Since certain changes may be made in the above article without departing from the scope of the invention herein involved, it is intended that all matter contained in the above description and shown in the accompanying drawings shall be interpreted as illustrative and not in a limiting sense.

I claim:

1. A device adapted to be secured to the rump of a cow, for determining cattle estrus, which device comprises:
    a base having a frangible semaphore serving means therein,
    a releasably secured spring loaded semaphore flag arm pivotally mounted on said base arm capable of movement to a generally vertical second position upon release from a first generally horizontal position upon the application of body weight of a second cow upon the rump of the wearer cow; and means to retain the semaphore in the first position.

2. A device for indicating when a cow is in heat comprising:
    an elongated base having a raised portion at one end, said raised portion including a cut out thereon,
    a flag arm having a first end and a second end, resiliently pivotably mounted at the first end to one end of said base, by a resilient means,
    a resilient means,
    an arm holder mounted to the other end of said base, comprising a flat plate having an upstanding frangible detent thereon, disposed within the cut out of said base,
    said arm's second end resilient biased in a first tensed position within said detent,
    whereby upon the application of pressure upon said arm, or upon said detent, said detent separates from said plate and said arm while still disposed within said detent moves to a second at rest position.

3. The device of claim 2 wherein said flag arm comprises a spring wire disposed within a tubular member, a portion of said spring arm retaining said arm to said detent.

4. The device of claim 2 wherein said base includes an adhesive layer on the underside thereof.

5. The device of claim 3 wherein said base includes an adhesive layer on the underside thereof.

6. The device of claim 2 wherein the arm holder's base plate also includes a pair of spaced upstanding spacing members to protect the frangible detent from the swishing tail of the wearer animal.

7. The device of claim 2 wherein the base included a pair of score lines from one end to the other end of said elongated base on opposite sides of said flag arm.

8. A device to advise the owner of a cow when the cow is in heat comprising:
    a main member comprising a one piece planar combination base and flag arm springingly pivotally connected at one end, the other end of said arm being free,
    an arm holder comprising an inverted U shape arm receiver and a holder base, said arm receiver angularly and fractureably mounted with respect to said holder base,
    said holder base secured to said base,
    whereby when said arm is inserted under tension into said arm receiver in a generally horizontal position, and pressure is applied to said arm, said arm receiver will fracture and separate from said holder base, while being retained on said arm, the tension is relieved and said arm together with said arm receiver assume a generally vertical position.

9. The device of claim 8 wherein the pivotal mounting comprises a pair of longitudinal bracing members disposed on said base on opposite sides of said flag arm with a bore at one end thereof; a pivot pin being disposed within said bore normal to said bracing members, and a coil spring's coil disposed on said pin.

10. The device of claim 9 wherein the detent is round shaped with a bore therethrough.

* * * * *